United States Patent
Senga et al.

(10) Patent No.: US 6,946,168 B2
(45) Date of Patent: Sep. 20, 2005

(54) REVERSIBLY THERMOCHROMIC ULTRAVIOLET RAY-HARDENING INK COMPOSITION AND REVERSIBLY THERMOCHROMIC LAMINATE USING THE SAME

(75) Inventors: Kuniyuki Senga, Nagoya (JP); Hiroki Harata, Nagoya (JP); Makoto Miyamoto, Nagoya (JP)

(73) Assignee: The Pilot Ink Co., Ltd., Aichi (JP)

( * ) Notice: Subject to any disclaimer, the term of this patent is extended or adjusted under 35 U.S.C. 154(b) by 0 days.

(21) Appl. No.: 10/271,592

(22) Filed: Oct. 17, 2002

(65) Prior Publication Data

US 2004/0077743 A1 Apr. 22, 2004

(51) Int. Cl.[7] .................. B32B 27/20; B32B 27/16; C09K 19/00; C08F 2/50
(52) U.S. Cl. ................ 428/1.1; 428/1.3; 428/402.2; 428/913; 522/64; 522/75; 522/79; 522/103; 522/182
(58) Field of Search ............... 428/1.1, 1.3, 402.2, 428/913; 522/64, 75, 79, 103, 182

(56) References Cited

U.S. PATENT DOCUMENTS

| | | | | |
|---|---|---|---|---|
| 4,028,118 A | * | 6/1977 | Nakasuji et al. | 106/31.19 |
| 4,425,161 A | * | 1/1984 | Shibahashi et al. | 106/31.17 |
| 4,720,301 A | | 1/1988 | Kito et al. | |
| 4,732,810 A | | 3/1988 | Kito et al. | |
| 5,490,956 A | * | 2/1996 | Kito et al. | 252/583 |
| 5,500,040 A | | 3/1996 | Fujinami | |
| 6,008,269 A | * | 12/1999 | Kitagawa et al. | 522/44 |
| 6,669,765 B2 | * | 12/2003 | Senga et al. | 106/31.16 |

* cited by examiner

Primary Examiner—Susan Berman
(74) Attorney, Agent, or Firm—Sughrue Mion, PLLC

(57) ABSTRACT

This invention provides a reversibly thermochromic ultraviolet ray-hardening type ink having good color change sensitivity and excellent light resistance and fastness, and a reversibly thermochromic laminate produced using the same. The present invention also provides a reversibly thermochromic laminate produced by forming a reversibly thermochromic layer on a support using the same. The ink comprises:

(1) a microencapsulated pigment comprising a reversibly thermochromic composition comprising (A) an electron-donating compound, (B) an electron-accepting compound and (C) a color change temperature-controlling agent which controls color reaction generation temperature of the former two compounds; and (D) a light resistance-providing agent represented by a specific formula, and (2) a photo-polymerizable composition comprising an ultraviolet ray absorbent, a reactive oligomer, a reactive monomer, and an acylphosphine oxide photo-polymerization initiator, wherein said microencapsulated pigment is dispersed in said photo-polymerizable composition.

3 Claims, No Drawings

REVERSIBLY THERMOCHROMIC ULTRAVIOLET RAY-HARDENING INK COMPOSITION AND REVERSIBLY THERMOCHROMIC LAMINATE USING THE SAME

FIELD OF THE INVENTION

This invention relates to a reversibly thermochromic ultraviolet ray-hardening ink composition and a reversibly thermochromic laminate which uses the same. More particularly, it relates to a reversibly thermochromic ultraviolet ray-hardening ink composition having both good and permanent reversibly thermochromic function and efficient ultraviolet ray-hardening property and to a reversibly thermochromic laminate which uses the same.

BACKGROUND OF THE INVENTION

A reversibly thermochromic ultraviolet ray-hardening ink composition containing a microencapsulated pigment in which a reversibly thermochromic composition comprising (A) an electron-donating compound, (B) an electron-accepting compound and (C) a medium which controls color reaction generation temperature of the former two compounds is contained has been disclosed (U.S. Pat. No. 5,500,040).

In general, light resistance of an electron-donating compound (A) in a reversibly thermochromic composition is not strong, so that an ultraviolet ray-hardening ink composition prepared using the same also has the same problem.

Accordingly, in the conventional ink, the ultraviolet ray absorbent contained in microcapsules and absorption wavelength of the photo-polymerizable composition contained in the vehicle are specified in order to improve light resistance of the reversibly thermochromic composition and to maintain the ultraviolet ray-hardening property. That is, by the use of a photo-polymerization initiator having a maximum absorption wavelength at more higher wavelength side of the ultraviolet ray absorbent having the effect to improve light resistance of the reversibly thermochromic composition, the ultraviolet ray absorbent does not hinder hardening generated by ultraviolet ray irradiation and, what is more, light resistance of the reversibly thermochromic composition is improved by the ultraviolet ray absorbent.

However, though a light resistance improving effect can be obtained by the conventional ink, joint use of the ultraviolet ray absorbent is apt to cause an inconvenience of spoiling color changing sensitivity which is one of the important color changing functions of the reversibly thermochromic composition, so that it has a disadvantage in that sharp coloring and discoloring or change of a color into another color having different tone cannot be shown by changes in temperature.

In addition, though formulation of the ultraviolet ray absorbent shows the effect to improve light resistance under discolored condition, it does not show sufficient effect to improve light resistance under colored condition.

SUMMARY OF THE INVENTION

The invention contemplates overcoming the problems involved in the conventional reversibly thermochromic ultraviolet ray-hardening ink composition, and thereby providing a reversibly thermochromic ultraviolet ray-hardening ink composition which shows permanent reversibly thermochromic function without spoiling its color change sensitivity and has efficient ultraviolet ray-hardening property, and a reversibly thermochromic laminate which uses the same.

The present invention provides a reversibly thermochromic ultraviolet ray-hardening ink composition, which comprises:

(1) a microencapsulated pigment comprising a reversibly thermochromic composition comprising (A) an electron-donating compound, (B) an electron-accepting compound and (C) a color change temperature-controlling agent which controls color reaction generation temperature of the former two compounds; and (D) a light resistance-providing agent represented by the following general formula (1):

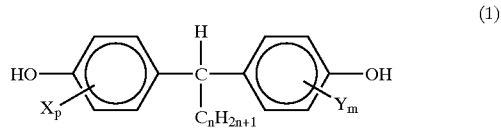

(1)

wherein n=5 to 17 (straight and branched), $X=C_1$ to $C_4$ (straight and branched) or halogen, $Y=C_1$ to $C_4$ (straight and branched) or halogen, p=0 to 3, and m=0 to 3, and (2) a photo-polymerizable composition comprising an ultraviolet ray absorbent, a reactive oligomer, a reactive monomer, and an acylphosphine oxide photo-polymerization initiator, wherein said microencapsulated pigment is dispersed in said photo-polymerizable composition.

The present invention also provides the above ink composition wherein the light resistance-providing agent (D) having electron receptive property is also served as the electron-accepting compound of (B).

The present invention further provides a reversibly thermochromic laminate, which comprises a support and provided thereon a reversibly thermochromic layer comprising the reversibly thermochromic ultraviolet ray-hardening ink composition of claim 1 or 2.

Other objects and advantages of the invention will be made apparent as the description progresses.

DETAILED DESCRIPTION OF THE INVENTION

The microcapsules contained in the ink composition comprises at least a reversibly thermochromic composition comprising (A) an electron-donating compound, (B) an electron-accepting compound and (C) a color change temperature-controlling agent, and (D) a light resistance-providing agent represented by the general formula (1).

Though the conventional ultraviolet ray absorbent contained in microcapsules has the effect to improve light resistance, it becomes difficult to show sharp color changing sensitivity as its adding amount increases.

Also, the electron-donating compound becomes an ionic state under an electron-donated condition, namely when it becomes a colored condition, and when it becomes this state, the light resistance is reduced and the electron donating property is reduced by light, particularly visible light, so that the reversibly thermochromic function is deteriorated.

Though inclusion of the ultraviolet ray absorbent is generally effective in improving light resistance of substances under molecular conditions, cutting of ultraviolet rays under the ionic state alone is not sufficient in a composition such as the reversibly thermochromic composition in which an electron-donated substance develops a color by changing into an ionic state and is discolored by changing into a molecular state, so that further cutting of visible light becomes necessary.

Since the light resistance-providing agent (D) to be used in the invention has an electron receptive property, when it is coexisted with the electron-donating compound (A) in the color change temperature-controlling agent of (C), it can form a colored state by showing strong ionic interaction with the electron-donating compound (A) under a color changing temperature or lower. As a matter of course, the electron-donating compound (A) forms a colored state by performing strong ionic interaction with the electron-accepting compound (B), but it is considered that stability of the ionic structures based on the ionic interaction under colored state is greatly different between the case of (A) and (B) and the case of (A) and the light resistance-providing agent. That is, it is considered that the whole structure of ionic state is under a stabilized condition against light, because the light resistance-providing agent has a long chain alkyl group, has high solubility in the color change temperature-controlling agent (C) having strong aliphatic atmosphere and forms a ionic state by exerting strong interaction with the electron-donating compound (A) even in a solid in which the color change temperature-controlling agent (C) is crystallized at a color changing temperature or lower in the reversibly thermochromic composition, and the long chain alkyl group moiety is stabilized in the color change temperature-controlling agent (C) under a state of weakly interacting with the color change temperature-controlling agent (C).

Accordingly, it is considered that the electron-donating compound (A) under ionic state does not undergo photo-decomposition or photo-oxidation when it causes photo-excitation by absorbing visible light, but forms a stable cycle as a whole in which it returns to the normal state by releasing the energy.

In addition, though there are various structures having long chain alkyl groups, the structure represented by the general formula (1) particularly shows superior light resistance improving effect, and it is considered that the reason for this may be due to its structure in which one side of the central carbon has hydrogen and the other side has an un-branched long chain alkyl group, thus exerting particularly excellent conformability, namely stability, in the solid in which the color change temperature-controlling agent (C) is crystallized.

On the other hand, in the case of a general electron-accepting compound (B), since it has a short alkyl group and less conformability in the solid in which the color change temperature-controlling agent (C) is crystallized at a color change temperature or less, ionic state structures of (A) and (B) seem to be present under a condition of poor stability, so that it is considered that photo-decomposition or photo-oxidation reaction precedes and deterioration progresses when the electron-donating compound (A) under ionic causes photo-excitation by absorbing visible light.

The light resistance-providing agent is a bisphenol compound or a bis(hydroxyphenyl) compound in which two phenyl rings having hydroxyl group are attached to an alkyl group, and the alkyl group has from 5 to 17 carbon atoms. When the number of carbon atoms is less than 5, its solubility in the color change temperature-controlling agent (C) having strong aliphatic atmosphere becomes insufficient due to the short alkyl group and sufficiently stabilized structure cannot be obtained under solid atmosphere at the color change temperature or less. Also, when the number of carbon atoms exceeds 17, its solubility in the color change temperature-controlling agent (C) having strong aliphatic atmosphere becomes too high due to the too long alkyl group, which is not practical when its practical sides are taken into consideration, because the color reaction becomes weak and color change sensitivity is spoiled.

It is most desirable that the alkyl group is a straight chain alkyl group, and when it has a branch, shorter branch is desirable.

Though there is a case in which a substituent group such as a straight or branched alkyl group or a halogen is attached to the phenyl ring, the light resistance is exerted almost in the same manner when the alkyl group to which phenyl rings are attached is the same as described above.

Since the light resistance-providing agent to be used in the invention also has the electron receptive property by itself, it is possible to adjust using amount of the electron-accepting compound by the use of this agent or the compound can be replaced thereby as occasion demands.

In case that the light resistance-providing agent (D) is used instead of the electron-accepting compound of component (B), since the compound has a long chain alkyl group and the phenolic hydroxyl group equivalent is reduced, it is used in an amount of from 0.3 to 7.0 parts by weight, particularly desirably from 2.0 to 7.0 parts by weight, based on 1.0 part by weight of the electron-donating compound of component (A).

Illustrative examples of the light resistance-providing agent include 1,1-bis(4-hydroxyphenyl)-n-hexane, 1,1-bis(4-hydroxyphenyl)-2-ethylbutane, 1,1-bis(4hydroxyphenyl)-2-methylpentane, 1,1-bis(4-hydroxyphenyl)-n-heptane, 1,1-bis(4-hydroxyphenyl)-2,3-dimethylpentane, 1,1-bis(4-hydroxyphenyl)-n-octane, 1,1-bis(4-hydroxyphenyl)-2ethylhexane, 1,1-bis(4-hydroxyphenyl)-n-nonane, 1,1-bis(4hydroxyphenyl)-n-decane, 1,1-bis(4-hydroxyphenyl)-3,7-dimethyloctane, 1,1-bis(4-hydroxyphenyl)-n-undecane, 1,1-bis(4-hydroxyphenyl)-n-dodecane, 1,1-bis(4-hydroxyphenyl)-n-tridecane, 1,1-bis(4-hydroxyphenyl)-n-tetradecane, 1,1-bis(4-hydroxyphenyl)-n-pentadecane, 1,1-bis(4-hydroxyphenyl)-n-hexadecane, 1,1-bis(4-hydroxyphenyl)-n-heptadecane, 1,1-bis(4-hydroxyphenyl)-n-octadecane, 1,1-bis(3-methyl-4-hydroxyphenyl)-n-hexane, 1,1-bis(3-methyl-4-hydroxyphenyl)-2-ethylbutane, 1,1-bis(3-methyl-4-hydroxyphenyl)-2-methylpentane, 1,1-bis(3-methyl-4-hydroxyphenyl)-n-octane, 1,1-bis(3-methyl-4-hydroxyphenyl)-2-ethylhexane, 1,1-bis(3-methyl-4-hydroxyphenyl)-n-decane, 1,1-bis(3-methyl-4-hydroxyphenyl)3,7-dimethyloctane, 1,1-bis(3-methyl-4-hydroxyphenyl)-n-dodecane, 1,1-bis(3-methyl-4-hydroxyphenyl)-n-tetradecane, 1,1-bis(3-methyl-4-hydroxyphenyl)-n-hexadecane, 1,1-bis(3-methyl-4-hydroxyphenyl)-n-octadecane, 1,1-bis(3-ethyl-4-hydroxyphenyl)-n-decane, 1,1-bis(3-isopropyl-4-hydroxyphenyl)-n-decane, 1,1-bis(3-n-butyl-4-hydroxyphenyl)-n-decane, 1,1-bis(3-sec-butyl-4-hydroxyphenyl)-n-decane, 1,1-bis(3-isobutyl-4-hydroxyphenyl)-n-decane, 1,1-bis(3-tert-butyl-4-hydroxyphenyl)-n-decane, 1,1-bis(3-fluoro-4-hydroxyphenyl)-n-decane, 1,1-bis(3-chloro-4-hydroxyphenyl)-n-decane, 1,1-bis(3-bromo-4-hydroxyphenyl)-n-decane, 1,1-bis(3-iodo-4-hydroxyphenyl)-n-decane, 1,1-bis(2-methyl-4-hydroxyphenyl)-n-decane, 1,1-bis(2-ethyl-4-hydroxyphenyl)-n-decane, 1,1-bis(2-chloro-4-hydroxyphenyl)-n-decane, 1,1-bis(2-bromo-4-hydroxyphenyl)-n-decane, 1,1-bis(2,3-dimethyl-4-hydroxyphenyl)-n-decane, 1,1-bis(2-methyl-4-hydroxy-5-tert-butylphenyl)-n-decane, 1,1-bis(2,6-dimethyl-4-hydroxyphenyl)-n-decane, 1,1-bis(3,5-dimethyl-4-hydroxyphenyl)-n-decane, 1,1-bis(3,5-di-sec-butyl-4-hydroxyphenyl)-n-decane, 1,1-bis(3,5-di-tert-butyl-4-hydroxyphenyl)-n-decane, 1,1-bis(2,3,5-trimethyl-4- hydroxyphenyl)-n-decane and 1,1-bis(2,3,6-trimethyl-4-hydroxyphenyl)-n-decane.

As the reversibly thermochromic composition to be contained in microcapsules together with the light resistance-providing agent (D), a composition containing three components of (A) an electron-donating compound, (B) an electron-accepting compound and (C) a reaction medium which determines color reaction generation temperature of the former two compounds is used; for example, those described in U.S. Pat. No. 4,028,118 and U.S. Pat. No. 4,732,810 can be used.

The composition changes color before and after a predetermined temperature (point of color change) as the border, shows a discoloring state at a temperature of the point of color change or more, and a coloring state at a temperature of less than the point of color change, and only a specified one state of these two states can be present within the ordinary temperature range. That is, the other state is a heat-discoloring type reversibly thermochromic composition which shows thermochromic behavior having a relatively small maximum hysteresis error in which this state is maintained while heat or cold necessary for expressing the state is applied but returned to a state of the ordinary temperature range when application of the heat or cold is cancelled.

In addition, a heat-discoloring type temperature-sensitive color-changing color-memorizing composition described in U.S. Pat. No. 4,720,301 can also be used, which shows large hysteresis characteristics, namely, according to a curve prepared by plotting the coloring concentration against temperature, it changes color via greatly different pathways from the case of increasing temperature from the lower temperature side than the color-changing region and to the case of conversely reducing temperature from the higher temperature side than the color-changing temperature, and memory of the colored state at a temperature equal to or lower than the point of color change of the low temperature side, or of the discolored state at a temperature equal to or higher than the point of color change of the high temperature side, can be kept tautologically even after discontinuation of the application of cold or heat required for the color change.

Ratio of each component of the reversibly thermochromic composition varies depending on its concentration, color changing temperature, color changing mode and kind, but the component ratios by which desired characteristics can be obtained are generally within the range of from 0.1 to 50 parts by weight, preferably from 0.5 to 20 parts by weight, for the component (B), and from 1 to 200 parts by weight, preferably from 5 to 100 parts by weight for the component (C), based on 1 part by weight of the component (A).

In this connection, each of the components (A), (B) and (C) may be a mixture of two or more compounds.

The reversibly thermochromic composition and light resistance-providing agent are used as microcapsular pigment contained in microcapsules. This is because such a mode satisfies practical properties such as clear and high concentration color developing property, uniformity, dispersion stability, drug resistance and heat resistance.

In this connection, the microcapsules ca be prepared by conventionally known methods such as interfacial polymerization, in situ polymerization, hardening coating in liquid, phase separation from aqueous solution, phase separation from organic solvent, melting dispersion cooling, suspension coating in air and spray drying.

In addition, the microcapsular pigment can also be subjected to practical use by further arranging a secondary resin coat on the surface to provide durability or modify the surface characteristics in response to the object.

As described in the foregoing, the light resistance is improved when an ultraviolet ray absorbent is contained in microcapsules, but there is a possibility that the color change sensitivity is spoiled as its adding amount is increased. Thus, by allowing the ultraviolet ray absorbent to be present in a photo-polymerizable composition outside the microcapsules, light resistance improving effect can be obtained without spoiling color change sensitivity of the reversibly thermochromic composition.

In this connection, regarding the light resistance improving effect, light resistances under both colored and discolored states can be improved by jointly using the light resistance-providing agent and the ultraviolet ray absorbent inside the capsules.

However, when the ultraviolet ray absorbent is present in the photo-polymerizable composition, it causes a problem in that the ultraviolet ray absorbent absorbs irradiated infrared to hinder hardening of an ink layer and thereby generate poor hardening during a step of hardening the ink by applying ultraviolet ray irradiation to the ink layer formed on the material to be printed.

Thus, according to the invention, this problem was solved by using an acylphosphine oxide photo-polymerization initiator as the photo-polymerization initiator in the photo-polymerizable composition.

The acylphosphine oxide photo-polymerization initiator is activated by an ultraviolet ray having a wavelength of approximately from 360 to 410 nm which is different from the absorption wavelength of general ultraviolet ray absorbent (about 280 to 360 nm). Accordingly, good ultraviolet ray-hardening property can be obtained even in the presence of the ultraviolet ray absorbent in the photo-polymerizable composition.

Also, since the reversibly thermochromic composition contained in microcapsules has relatively low coloring concentration, there is a case in which it is added to the photo-polymerizable composition in an amount larger than a general dyestuff or pigment or in which the ink layer to be formed on the base material surface is formed in a relatively large thickness, and in that case too, good ultraviolet ray-hardening property can be obtained by the use of the acylphosphine oxide photo-polymerization initiator.

Examples of the acylphosphine oxide photo-polymerization initiator to be used as the photo-polymerization initiator include 2,4,6-trimethylbenzoyldiphenylphosphine oxide, 2,6-dimethoxybenzoyldiphenylphosphine oxide, 2,6-dichlorobenzoyldiphenylphosphine oxide, ethyl-2,4,6-trimethylbenzoylphenylphosphine oxide, bis(2,6-dimethoxybenzoyl)-2,4,4-trimethylpentylphosphine oxide, bis(2,6-dicyclobenzoyl)-4-propylphenylphosphine oxide and bis(2,6-dicyclobenzoyl)-2,5-dimethylphenylphosphine oxide.

Also, conventional general purpose photo-polymerization initiators may be jointly used as occasion demands, which include acetophenone initiators such as acetophenone, dimethoxyacetophenone, 2-phenyl-2,2-dimethoxyacetophenone, 2-hydroxy-2,2-dimethoxyacetophenone, trichloroacetophenone, p-methylthio-2-morpholino-2,2-dimethylacetophenone and 1-hydroxycyclohexylphenyl ketone, benzophenone initiators such as benzophenone, [4-[(4-methylphenyl)thio]phenyl]phenyl-methanone, Michler's ketone, [4-phenylthiophenyl]phenyl-methanone,

[4-phenylthiophenyl]-2'-chlorophenyl-methanone,
[4-phenylthiophenyl]-4'-methoxyphenyl-methanone,
[4-phenylthiophenyl]-2',4'-dichlorophenyl-methanone and chloromethylbenzophenone, thioxanthone initiators such as thioxanthone, 2-chlorothioxanthone, 2,4-diethylthioxanthone, isopropylthioxanthone and 1-chloro-4-propoxythioxanthone, benzoin ether initiators and α-acyloxime ester initiators.

Examples of the ultraviolet ray absorbent include a benzophenone ultraviolet ray absorbent such as
2,4-hydroxybenzophenone,
2-hydroxy-4-methoxybenzopnenone,
2,2'-dihydroxy-4,4'-dimethoxybenzophenone,
2,2',4,4'-tetrahydroxybenzophenone,
2-hydroxy-4-methoxybenzopnenone-5-sulfonic acid,
2-hydroxy-4-octoxybenzophenone,
bis-(2-methoxy-4-hydroxy-5-benzoylphenyl)-methane,
2-[2'-hydroxy-3'-5'-di-t-amylphenyl]-benzophenone,
2-hydroxy-4-dodecyloxy-benzophenone (trade name: Sea Sorb 103, mfd. by Cipro Kasei),
2-hydroxy-4-octadecyloxybenzophenone,
2,2'-dihydroxy-4-methoxybenzophenone,
2-hydroxy-4-benzyloxybenzophenone, or
2-[2'-hydroxy-3'-5'-di-t-amylphenyl]-benzophenone,
a salicylic acid ultraviolet ray absorbent such as phenyl salicylate,
para-t-butylphenyl salicylate,
paraoctylphenyl salicylate,
2,4-di-t-butylphenyl-4-hydroxy benzoate,
1-hydroxy benzoate,
1-hydroxy-3-t-butyl benzoate,
1-hydroxy-3-t-octyl benzoate, or
resorcinol monobenzoate,
a cyanoacrylate ultraviolet ray absorbent such as ethyl-2-cyano-3,3'-diphenyl acrylate,
2-ethylhexyl-2-cyano-3,3'-diphenyl acrylate, or
2-ethylhexyl-2-cyano-3-phenyl cinnate,
a benzotriazole ultraviolet ray absorbent such as 2-[5-t-butyl-2-hydroxyphenyl]-benzotriazole (trade name Chinubin-PS, mfd. by Ciba-Geigy),
2-[5-methyl-2-hydroxyphenyl]-benzotriazole,
2-[2-hydroxy-3,5-bis(a,a-dimethylbenzyl)phenyl]-2H-benzotriazole,
2-[3,5-di-t-butyl-2-hydroxyphenyl]benzotriazole,
2-[3-t-butyl-5-methyl-2-hydroxyphenyl]-5-chlorobenzotriazole,
2-[3,5-di-t-butyl-2-hydroxyphenyl]-5-chlorobenzotriazole,
2-[3,5-di-t-amyl-2-hydroxyphenyl]-benzotriazole (trade name Chinubin 328, mfd. by Ciba-Geigy),
methyl-3-[3-t-butyl-5-(2H-benzotriazol-2-yl)-4-hydroxyphenyl]propionate-polyethylene glycol molecular weight 300 (trade name Chinubin 1130, mfd. by Ciba-Geigy),
2-[3-dodecyl-5-methyl-2-hydroxyphenyl]benzotriazole,
methyl-3-[3-(2H-benzotriazol-2-yl)-5-t-butyl-4-hydroxyphenyl]propionate-polyethylene glycol molecular weight 300,
2-[3-t-butyl-5-propyloctylate-2-hydroxyphenyl-5-chlorobenzotriazole,
2-[2-hydroxyphenyl-3,5-di-(1,1'-dimethylbenzyl)phenyl]-2H-benzotriazole,
2-[2-hydroxy-5-t-octylphenyl]-2H-benzotriazole,
2-[3-t-butyl-5-octyloxycarbonylethyl-2-hydroxyphenyl]-benzotriazole (trade name Chinubin 384, mfd. by Ciba-Geigy),
2-[2-hydroxy-5-tetraoctylphenyl]-benzotriazole,
2-[2-hydroxy-4-octoxyphenyl]-benzotriazole, 2-[2'-hydroxy-3'-(3",4",5",6"-tetrahydrophthalimidomethyl)-5'-methylphenyl]-benzotriazole, or
2-(2-hydroxy-5-t-butylphenyl)-benzotriazole, and an oxalic acid anilide ultraviolet ray absorbent such as ethanediamido-N-(2-ethoxyphenyl)-N'-(4-isodecyl phenyl), or
2,2,4,4-tetramethyl-20-(β-lauryl-oxycarbonyl)-ethyl-7-oxa-3,20-diazodispiro(5,1,11,2)heneicosan-21-one.

Also useful as the ultraviolet ray absorbent are a copolymer of [2-(2'-hydroxy-5'-methacryloxyethylphenyl)-2H-benzotriazol] with methyl methacrylate, a copolymer of [2-(2'-hydroxy-5'-methacryloxyethylphenyl)-2H-benzotriazol] with styrene, a copolymer of [2-hydroxy-4-(methacryloyloxyethoxy)benzophenone] with methyl methacrylate and 2-[2'-hydroxy-5'-methacryoxyethylphenyl)-2H-benzotriazole.

The photo-polymerization composition comprises at least a reactive oligomer to be used as the base polymer, a reactive monomer to be used as a reactive diluent and an acylphosphine oxide photo-polymerization initiator, and examples of the reactive oligomer include polyester acrylate, polyurethane acrylate, epoxy acrylate, polyether acrylate, oligo acrylate, alkyde acrylate and polyol acrylate. Also, examples of the reactive monomer include monofunctional monomers such as 2-ethylhexyl acrylate and 2-hydroxyethyl acrylate, bifunctional monomers such as 1,3-butanediol acrylate, neopentylglycol diacrylate and 1,6-hexanediol acrylate, and multifunctional monomers such as trimethylolpropane triacrylate and dipentaerythritol hexaacrylate.

Mixing ratio of these components is not particularly limited, but it is generally from 10 to 500 parts by weight of the reactive monomer, from 0.1 to 100 parts by weight of the acylphosphine oxide photo-polymerization initiator, from 10 to 200 parts by weight of the microcapsule pigment and from 0.1 to 10 parts by weight of the ultraviolet ray absorbent, based on 100 parts by weight of the base oligomer.

In addition to these components, various additives and general pigments can be added as occasion demands, which include photosensitizers such as N-methyldiethanolamine, Michler's ketone, 4-dimethylaminoethyl benzoate and 4-dimethylaminoisoamyl benzoate, oxidation polymerization catalysts which are metal compounds such as of cobalt, manganese, lead and iron, such as cobalt octylate, cobalt naphthenate and lead monoxide, an antifoaming agent, a leveling agent, an infrared absorbent, an antioxidant, a singlet oxygen quencher, an age resistor, an anti-static agent, a thixotropy providing agent, an extender, a viscosity controlling agent, a dispersing agent, a flatting agent, a penetrating agent, a pH adjusting agent, an antiseptic, an anti-corrosive agent, a polymerization inhibitor and a silane coupling agent.

A reversibly thermochromic laminate is obtained by arranging a reversibly thermochromic layer of the thus obtained reversibly thermochromic ultraviolet ray-hardening type ink on the surface of a support by a generally known method, e.g., a printing means such as screen printing, offset printing, gravure printing, coater, pad printing or decalcomania, or another means such as brush application, spray coating, flow coating, roller coating or dip coating, and hardening the layer by ultraviolet ray irradiation.

In this connection, the reversibly thermochromic laminate has good and permanent reversibly thermochromic function similar to the ink.

Though material and shape of the support are not particularly limited, examples of the material include plastics (plastic films), glass, metals, stone, pottery, wood, synthetic paper, cloth, flocked or raised fabric, non-woven fabric, synthetic leather and leather.

Also, shape of the laminate may be irregular in addition to a flat shape. Its illustrative examples include drink containers, toys, artificial flowers, stationary, daily necessities, dressing tools, accessories, lighting fixture, sporting goods, printing matter, vehicles, clothing, footwear and interior decorations.

In addition, the reversibly thermochromic layer may be a design such as a letter, a symbol, a pattern or a combination of lines or an optional shape of image (design).

In addition, a protective layer can be arranged on the reversibly thermochromic layer of the reversibly thermochromic laminate. Also, more higher light resistance improving effect can be obtained when a layer containing a light stabilizer and/or a light shielding pigment is arranged on the reversibly thermochromic layer.

Examples of the light shielding pigment include pigments such as metallic luster pigment, transparent titanium dioxide, transparent iron oxide, transparent cesium oxide and transparent zinc oxide.

As has been described in the foregoing, the reversibly thermochromic ultraviolet ray-hardening type ink of the invention is obtained by mixing a reversibly thermochromic microcapsule pigment prepared in advance, an ultraviolet ray absorbent and a photo-polymerizable composition.

Various laminates and printing matter are obtained by forming a reversibly thermochromic layer of the ink on the surface of a support and then hardening it using a general purpose ultraviolet ray irradiator.

Examples of the invention are given below by way of illustration and not by way of limitation. In this connection, the term "part(s)" in the examples means part(s) by weight.

INVENTIVE EXAMPLE 1

Production of Reversibly Thermochromic Microcapsule Pigment

A reversibly thermochromic microcapsule pigment A which changes color into colorless at 23° C. or more and into pink at 18° C. or less was obtained by micro-encapsulating 1 part of 6-diethylamino-7,8-benzofluoran as an electron-donating compound, 2 parts of bisphenol A as an electron-accepting compound, 50 parts of butyl stearate as a color change temperature controlling agent and 4 parts of 1,1-bis-(4-hydroxyphenyl)-n-octane as a light resistance-providing agent with the wall of a polyurea resin membrane composed of a polyvalent isocyanate/amine.

Preparation of Reversibly Thermochromic Ultraviolet Ray-hardening Type Ink

A reversibly thermochromic ultraviolet ray-hardening type ink was obtained by kneading 20 parts of the reversibly thermochromic microcapsule pigment A (powder), 8 parts of a dispersing agent, 37 parts of an epoxy acrylate oligomer and 2.5 parts of 2-(hydroxy-5-t-butylphenyl)benzotriazole as an ultraviolet ray absorbent with a solution prepared by heat-dissolving 5 parts of 2,4,6-trimethylbenzoyldiphenylphosphine oxide as a photo-polymerization initiator in 26 parts of tetramethylolmethane triacrylate, and further adding 3 parts of a sensitizer and an antifoaming agent, a leveling agent and a silane coupling agent in respective optional amounts.

Preparation of Reversibly Thermochromic Laminate

A reversibly thermochromic printing layer was formed on the surface of transparent glass as the support by carrying out a heart-pattern screen printing of the reversibly thermochromic ultraviolet ray-hardening type ink using a 100 mesh screen plate, and then a reversibly thermochromic laminate was obtained by carrying out ultraviolet ray irradiation from a 160 W/cm metal halide lamp under conditions of 20 cm in irradiation distance and 15 m/min in line speed.

The reversibly thermochromic glass obtained in this manner develops a pink heart pattern at 18° C. or less and becomes colorless at 23° C. or more.

Also, when the printing layer was subjected to an adhesiveness test by crosscut cellophane tape peeling, the printing layer showed good adhesiveness because it was not peeled from the support.

INVENTIVE EXAMPLE 2

Production of Reversibly Thermochromic Microcapsule Pigment

A reversibly thermochromic microcapsule pigment B which changes color into colorless at 32° C. or more and into black at 28° C. or less was obtained by micro-encapsulating 3 parts of 3-dibutylamino-6-methyl-7-anilinofluoran as an electron-donating compound, 8 parts of 1,1-bis(4-hydroxyphenyl)-n-decane as an electron-accepting compound also serving as a light resistance-providing agent and 45 parts of stearyl caprate and 5 parts of stearyl laurate as color change temperature-controlling agents with the wall of a polyurea resin membrane composed of a polyvalent isocyanate/amine.

Preparation of Reversibly Thermochromic Ultraviolet Ray-hardening Type Ink

A reversibly thermochromic ultraviolet ray-hardening type ink was obtained by kneading 30 parts of the reversibly thermochromic microcapsule pigment B (powder), 40 parts of a rosin-modified acrylate oligomer and 2.5 parts of 2-(3-t-butyl-5-octyloxycarbonylethyl-2-hydroxyphenyl)-benzotriazole as an ultraviolet ray absorbent with a solution prepared by heat-dissolving 5 parts of 2,4,6-trimethylbenzoyldiphenylphosphine oxide as a photo-polymerization initiator in 24 parts of 3 mol propylene oxide addition product of trimethylolpropane triacrylate, and further adding an antifoaming agent and a leveling agent in optional amounts.

Preparation of Reversibly Thermochromic Laminate

Using a paper pamphlet as the support on which a non-color changing print image of a person pictured inside a TV screen was offset-printed, a reversibly thermochromic printing layer was formed on the TV screen image by carrying out screen printing of the reversibly thermochromic ultraviolet ray-hardening type ink using a 80 mesh screen plate, and then a reversibly thermochromic laminate was obtained by carrying out ultraviolet ray irradiation from a 120 W/cm metal halide lamp under conditions of 20 cm in irradiation distance and 7 m/min in line speed.

The reversibly thermochromic layer of the reversibly thermochromic pamphlet has a thickness of about 50 µm, and the TV screen develops black color at 28° C. or less as if the TV power was shut off, but when heated to 32° C. or more, the reversibly thermochromic layer changes from black into colorless and the lower layer non-color changing printed image (human image) is visualized as if the TV power was connected.

Also, when the reversibly thermochromic layer was subjected to an adhesiveness test by crosscut cellophane tape peeling, the layer showed good adhesiveness because it was not peeled from the thermally not color-changing image except for the generation of material breaking caused by tearing of the paper.

COMPARATIVE EXAMPLE 1

A microcapsule pigment was produced in the same manner as in Inventive Example 1 except that the ultraviolet ray absorbent of Inventive Example 1 was excluded, and an ink was prepared using the microcapsule pigment to obtain similar reversibly thermochromic laminate.

The thus obtained laminate was inferior in terms of light resistance in comparison with the laminate obtained in Inventive Example 1, and particularly, it spoiled the nice point of changing color of the heart pattern from colored to uncolored due to yellowing of the image at the time of discoloration.

COMPARATIVE EXAMPLE 2
Production of Reversibly Thermochromic Microcapsule Pigment A reversibly thermochromic microcapsule pigment C was obtained by micro-encapsulating 1 part of 6-diethylamino-7,8-benzofluoran as an electron-donating compound, 5 parts of bisphenol A as an electron-accepting compound, 50 parts of butyl stearate as a color change temperature-controlling agent and 5.0 parts of 2-(hydroxy-5-t-butylphenyl) benzotriazole as an ultraviolet ray absorbent with the wall of a polyurea resin membrane composed of a polyvalent isocyanate/amine.

The microcapsule pigment C became colorless at 23° C. or more, but having such a low color change sensitivity that it started to develop pink color gradually at 18° C. and completely developed the color by cooling to 5C.

By preparing an ink by the same method of Inventive Example 1 except that this microcapsule pigment was used, similar reversibly thermochromic laminate was obtained.

This laminate (reversibly thermochromic glass) spoiled its commercial value due to such a low sensitivity that it did not sufficiently develop the color even when cold water was poured, and the heart pattern was gradually developed by reducing the water temperature by adding ice pieces.

COMPARATIVE EXAMPLE 3

A microcapsule pigment was produced by the same method of Inventive Example 2, except that the light resistance-providing agent 1,1-bis(4-hydroxyphenyl)-n-decane of Inventive Example 2 was changed to 1,1-bis(4-hydroxyphenyl)-2-methylpropane, and similar reversibly thermochromic laminate was obtained by preparing an ink using this microcapsule pigment.

The thus obtained laminate spoiled the nice point of changing color from vivid black to colorless, because its discoloration started after about one week under interior light, reduction of black color concentration at the time of color development was intense and browning of the reversibly thermochromic layer at the time of color removal was also intense.

COMPARATIVE EXAMPLE 4

A microcapsule pigment was produced by the same method of Inventive Example 2, except that the photo-polymerization initiator 2,4,6-trimethylbenzoyldiphenylphosphine oxide of Inventive Example 2 was changed to 2,2-dimethoxy-1,2-diphenyl-ethanone, and similar reversibly thermochromic laminate was obtained by preparing an ink using this microcapsule pigment.

Though the surface of the reversibly thermochromic layer of the thus obtained laminate was hardened, it did not satisfy practicality due to imperfect hardening of inside of the layer by the use of this photo-polymerization initiator, a tendency to peel off a part of the layer by cellophane tape peeling and poor ultraviolet ray hardening property of the reversibly thermochromic layer, because thickness of the reversibly thermochromic layer was relatively thick (about 50 μm), the temperature-sensitive color-changing microcapsule pigment was formulated in a large amount and the ultraviolet ray absorbent was added to the photo-polymerizable composition.

Thus, as has been described in the foregoing, the invention can provide a highly practical reversibly thermochromic ultraviolet ray-hardening type ink having good sensitivity to change color by temperature changing and also having excellent light resistance and fastness under both colored state and decolored state of the reversibly thermochromic composition, and a reversibly thermochromic laminate produced using the same, which has the nice point of changing color and can be applied to various commodities.

While the invention has been described in detail and with reference to specific embodiments thereof, it will be apparent to one skilled in the art that various changes and modifications can be made therein without departing from the scope thereof.

This application is based on Japanese patent application No. 2000-11168 filed Apr. 13, 2000, the entire contents thereof being hereby incorporated by reference.

What is claimed is:

1. A reversibly thermochromic ultraviolet ray-hardening ink composition, which comprises:

(1) a microencapsulated pigment comprising a reversibly thermochromic composition comprising (A) an electron-donating compound, (B) an electron-accepting compound and (C) a color change temperature-controlling agent which controls color reaction generation temperature of the former two compounds; and (D) a light resistance-providing agent represented by formula (1):

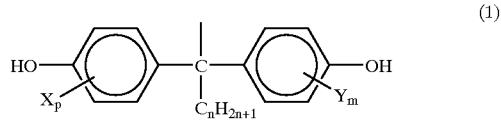

(1)

wherein n=8 to 17, $C_nH_{2n+1}$ represents a straight or branched alkyl group, $X=C_1$ to $C_4$ straight or branched alkyl group or halogen, $Y=C_1$ to $C_4$ straight or branched alkyl group or halogen, p=0 to 3, and m=0 to 3, and (2) a photo-polymerizable composition comprising an ultraviolet ray absorbent, a reactive oligomer, a reactive monomer, and an acylphosphine oxide photo-polymerization initiator, wherein said microencapsulated pigment is dispersed in said photo-polymerizable composition.

2. The reversibly thermochromic ultraviolet ray-hardening ink composition according to claim 1, wherein the light resistance-providing agent (D) is a light resistance-providing agent having electron receptive property and also serves as electron-accepting compound (B).

3. A reversibly thermochromic laminate, which comprises a support and provided thereon a reversibly thermochromic layer formed by printing the reversibly thermochromic ultraviolet ray-hardening ink composition of claim 1 or 2 on the support and photocuring the ink composition.

* * * * *